United States Patent
Jacobson et al.

(10) Patent No.: US 11,831,651 B2
(45) Date of Patent: *Nov. 28, 2023

(54) PREVENTING DATA MANIPULATION AND PROTECTING USER PRIVACY IN DETERMINING ACCURATE LOCATION EVENT MEASUREMENTS

(71) Applicant: Google LLC, Mountain View, CA (US)

(72) Inventors: Alex Daniel Jacobson, Mountain View, CA (US); Gang Wang, Jersey City, NJ (US)

(73) Assignee: Google LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/742,993

(22) Filed: May 12, 2022

(65) Prior Publication Data

US 2022/0345465 A1    Oct. 27, 2022

Related U.S. Application Data

(63) Continuation of application No. 16/908,394, filed on Jun. 22, 2020, now Pat. No. 11,368,469.

(51) Int. Cl.
*H04L 29/06*        (2006.01)
*H04L 9/40*         (2022.01)
(Continued)

(52) U.S. Cl.
CPC ............ *H04L 63/107* (2013.01); *H04L 9/085* (2013.01); *H04L 9/3213* (2013.01);
(Continued)

(58) Field of Classification Search
None
See application file for complete search history.

(56) References Cited

U.S. PATENT DOCUMENTS 8,520,855 B1    8/2013  Kohno et al.
8,858,313 B1    10/2014 Selfors
(Continued)

FOREIGN PATENT DOCUMENTS

CN    101589596    11/2009
EP    1098289      5/2001
(Continued)

OTHER PUBLICATIONS github.com [online], "Click Through Conversion Measurement Event-Level API Explainer," Aug. 2020, retrieved on Nov. 21, 2012, retrieved from URL <https://github.com/WICG/conversion-measurement-api/blob/master/AGGREGATE.md>, 14 pages.
(Continued)

*Primary Examiner* — Benjamin E Lanier
(74) *Attorney, Agent, or Firm* — Fish & Richardson P.C.

(57) ABSTRACT

This disclosure relates to generating location event measurements. In one aspect, a method includes presenting, by a client device, a digital component comprising geofence data that defines one or more physical locations corresponding to the digital component. In response to presenting the digital component, a trusted program of the client device stores, in a presentation event data structure, a presentation event data element specifying the geofence data. The trusted program detects, based on location information indicating a current location of the client device and the geofence data that the client device is within one of the one or more physical locations. In response to detecting that the client device is within one of the one or more physical locations, an event report is transmitted to a reporting system for the digital component. The event report indicates that a location event for the digital component has occurred.

17 Claims, 6 Drawing Sheets

(51) Int. Cl.
*H04L 9/08* (2006.01)
*H04L 9/32* (2006.01)

(52) U.S. Cl.
CPC ........ *H04L 9/3247* (2013.01); *H04L 63/0442* (2013.01); *H04L 63/0876* (2013.01); *H04L 63/20* (2013.01)

(56) References Cited

U.S. PATENT DOCUMENTS

| | | | |
|---|---|---|---|
| 10,430,895 B2 | 10/2019 | Soli | |
| 11,368,469 B2 * | 6/2022 | Jacobson | H04L 63/107 |
| 2008/0182592 A1 | 7/2008 | Cha et al. | |
| 2011/0320259 A1 | 12/2011 | Roumeliotis et al. | |
| 2013/0217332 A1 | 8/2013 | Altman et al. | |
| 2018/0121913 A1 | 5/2018 | Unnerstall et al. | |
| 2018/0211724 A1 | 7/2018 | Wang | |
| 2019/0068563 A1 | 2/2019 | Kurian | |
| 2020/0082113 A1 | 3/2020 | Liesdonk et al. | |

FOREIGN PATENT DOCUMENTS

| | | |
|---|---|---|
| GB | 2568744 | 5/2019 |
| JP | 2001-134650 | 5/2001 |
| JP | 2009-532749 | 9/2009 |
| JP | 2010-519788 | 6/2010 |
| KR | 10-2009-0114419 | 11/2009 |
| KR | 10-1393674 | 5/2014 |
| KR | 10-2034143 | 10/2019 |
| WO | WO 2008094452 | 8/2008 |
| WO | WO 2016/018217 | 2/2016 |

OTHER PUBLICATIONS github.com [online], "Conversion Measurement with Aggregation Explainer," Apr. 2020, retrieved on Nov. 21, 2012, retrieved from URL <https://github.com/WICG/conversion-measurement-api/blob/master/AGGREGATE.md>, 8 pages.
International Search Report and Written Opinion in International Appln. No. PCT/US2021/038403, dated Nov. 15, 2021, 22 pages.
Invitation to Pay Additional Fees and, Where Applicable, Protest Fee in International Appln. No. PCT/US2021/038403, dated Sep. 24, 2021, 13 pages.
Office Action in Indian Appln. No. 202227025338, dated Feb. 14, 2023, 8 pages (with English translation).
International Preliminary Report on Patentability in International Appln. No. PCT/US2021/038403, dated Jan. 5, 2023, 14 pages.
Notice of Allowance in European Appln. No. 21742603.0, dated Apr. 18, 2023, 9 pages.
Office Action in Japanese Appln. No. 2022-530967, dated Sep. 19, 2023, 8 pages (with English translation).
Office Action in Korean Appln. No. 10-2022-7017120, dated Sep. 6, 2023, 12 pages (with English translation).

* cited by examiner

PREVENTING DATA MANIPULATION AND PROTECTING USER PRIVACY IN DETERMINING ACCURATE LOCATION EVENT MEASUREMENTS

CROSS REFERENCE TO RELATED APPLICATION

This application is a continuation of U.S. application Ser. No. 16/908,394, filed Jun. 22, 2020, the contents of which are incorporated by reference herein.

BACKGROUND

Client devices transmit data over public networks, such as the Internet. These communications can be intercepted and/or altered by entities other than the intended recipient. In addition, entities can forge network identities and send data that appears to originate from these forged network identities.

SUMMARY

This specification describes technologies relating to generating location event measurements in ways that prevent fraud and protect user privacy.

In general, one innovative aspect of the subject matter described in this specification can be embodied in methods that include presenting, by a client device, a digital component comprising geofence data that defines one or more physical locations corresponding to the digital component. In response to presenting the digital component, a trusted program of the client device stores, in a presentation event data structure, a presentation event data element specifying the geofence data. The trusted program detects, based on location information indicating a current location of the client device and the geofence data, that the client device is within one of the one or more physical locations. In response to detecting that the client device is within one of the one or more physical locations, an event report is transmitted to a reporting system for the digital component. The event report indicates that a location event for the digital component has occurred. Other implementations of this aspect include corresponding apparatus, systems, and computer programs, configured to perform the aspects of the methods, encoded on computer storage devices.

These and other implementations can each optionally include one or more of the following features. In some aspects, the event report includes an attestation token. The attestation token can include a set of data that includes a device public key of the client device, an attestation token creation time indicating a time at which the attestation token was created, a device integrity token indicating a level of trustworthiness of the client device, and payload data comprising a location identifier for the one physical location. The attestation token can also include a digital signature of the set of data generated using a device private key corresponding to the device public key.

In some aspects, the payload data of the attestation token includes at least one of (i) a visit duration of the visit to the one physical location, (ii) a starting time of the visit, or (iii) an end time of the visit. Some aspects can include assigning a visit duration of the visit to a given visit duration quantile of multiple visit duration quantiles and including the visit duration quantile in the payload data, assigning a starting time of the visit to a given start time quantile of multiple start time quantiles and including the given start time quantile in the payload data, and/or assigning an end time of the visit to a given end time quantile of multiple end time quantiles and including the given end time quantile in the payload data. Some aspects can include transmitting, to the reporting system, a presentation report including a presentation attestation token in response to presenting the digital component. The presentation attestation token can include the set of data and the digital signature of the set of data.

In some aspects, providing the event report to the reporting system includes generating, using a threshold encryption scheme, a share of a secret that specifies event data including at least a location identifier for the one physical location, and including the share of the secret in the event report. The reporting system can decrypt the secret when at least a threshold number of event reports comprising respective shares of the secret are received from client devices that present the digital component.

Some aspects include transmitting, to a first aggregation server and in response to the presentation of the digital component, a presentation report including encrypted presentation data for the presentation of the digital component and a first blindly signed key including (i) a first encrypted data element including an encrypted combination of at least the resource locator for the reporting system, an identifier of the client device or a user of the client device, and a location identifier for the one physical location and (ii) a first blind signature generated based on the first encrypted data element. Transmitting the event report can include transmitting, to a second aggregation server, the event report. The event report can include encrypted event data for the digital component and a second blindly signed key including (i) a second encrypted data element including an encrypted combination of at least the resource locator for the reporting system, the identifier of the client device or the user of the client device, and the location identifier and (ii) a second blind signature generated based on the second encrypted data element. The first aggregation server and the second aggregation server can perform multi-party computation using the first and second blindly signed keys to join and decrypt the encrypted presentation data and the encrypted event data. The first aggregation server and the second aggregation server can apply a thresholding technique to the multi-party computation process to only decrypt encrypted presentation data and encrypted event data for each blindly signed key for which the blindly signed key was received from at least a threshold number of different client devices.

Some aspects include prompting a user of the client device for permission to transmit the event report prior to transmitting the event report to the reporting system. The event report can be transmitted to the reporting system in response to the user providing permission to transmit the event report. In some aspects, the trusted program is an operating system of the client device.

The subject matter described in this specification can be implemented in particular embodiments so as to realize one or more of the following advantages. The accuracy of reporting and aggregating location event measurements, e.g., the number of times users visit a physical location of an entity corresponding to a digital component, is increased by having client devices report the location events. Absent the techniques described in this document, these measurements may not be determined in an accurate and trustworthy manner.

The described techniques also ensure that location events are reported in ways that prevent manipulation of the data and prevent the aggregation of data from compromised or fraudulent client devices. For example, the location event data can be reported using attestation tokens that are digitally signed using a private key of the client device so that manipulation of the data of the attestation token can be detected. The attestation token can also include a device integrity token that indicates whether the client device is trustworthy and that includes a digital signature of a trusted device evaluator that certified the client device as trustworthy to ensure that the reported data is received from a trusted device. Secure multi-party computation, differential privacy techniques (or similar techniques), and/or threshold encryption techniques can also be used to protect user privacy and prevent fraud in reporting and aggregating of location event data. The techniques described in this document provide an efficient and reliable way to determine how many users actually visit a physical location of an entity corresponding to a digital component after the digital component is presented to the users, while preventing the falsification of the location event counts and protecting user privacy. Using such techniques enable the recipient to trust requests and other communications without having to perform additional security measures, which therefore reduces the computational requirements (e.g., CPU cycles) and network bandwidth that would typically be consumed to perform such processes.

Various features and advantages of the foregoing subject matter is described below with respect to the figures. Additional features and advantages are apparent from the subject matter described herein and the claims.

BRIEF DESCRIPTION OF THE DRAWINGS

Like reference numbers and designations in the various drawings indicate like elements.

DETAILED DESCRIPTION

In general, this document describes systems and techniques that improve data integrity, prevent data manipulation, e.g., fraud, and protect user privacy when reporting and aggregating location event data, e.g., location event measurements. Different techniques can be used based on the desired level of user privacy protection, applicable privacy rules, and/or user expectations. For example, different techniques can be used for event-level location data reporting relative to aggregate reporting.

In some implementations, trusted code of a client device generates attestation tokens that attest to the validity of location event data and prevents manipulation of the data after the token is generated. The trusted code can be, for example, operating system code or binary code of an application. The attestation token can include, among other data, data indicating a level of trustworthiness of the client device sending the token and a digital signature of the data so that the validity of the data can be verified by an entity that receives the token, e.g., even if the token passes through multiple intermediary entities.

Threshold encryption schemes can be used to collect and determine aggregate location event measurement data. Each client device can use a threshold encryption scheme to generate a share of a secret, e.g., event data for a location-based conversion associated with a digital component, and send the share of the secret to a reporting system. Using the threshold encryption schemes, the reporting system can only decrypt the event data when a threshold number of shares of the secret are received from client devices. This prevents entities from being able to track individual users.

Secure multi-party computation and differential privacy (or similar) techniques can be used to collect and aggregate location event measurement data. Each client device can send encrypted presentation data to a first aggregation server and send encrypted location event data to a second aggregation server. The encrypted data can be sent with a join key that enables the aggregation servers to join presentation data with location event data and decrypt the encrypted data using secure multi-party computation. Threshold encryption techniques can be used to ensure that data is only decrypted when event data for the same event (e.g., for the same digital component and the same location) is received from at least a threshold number of client devices. Additional privacy techniques can be used to insert random noise into measurement data, similar to differential privacy techniques.

Figure 1:
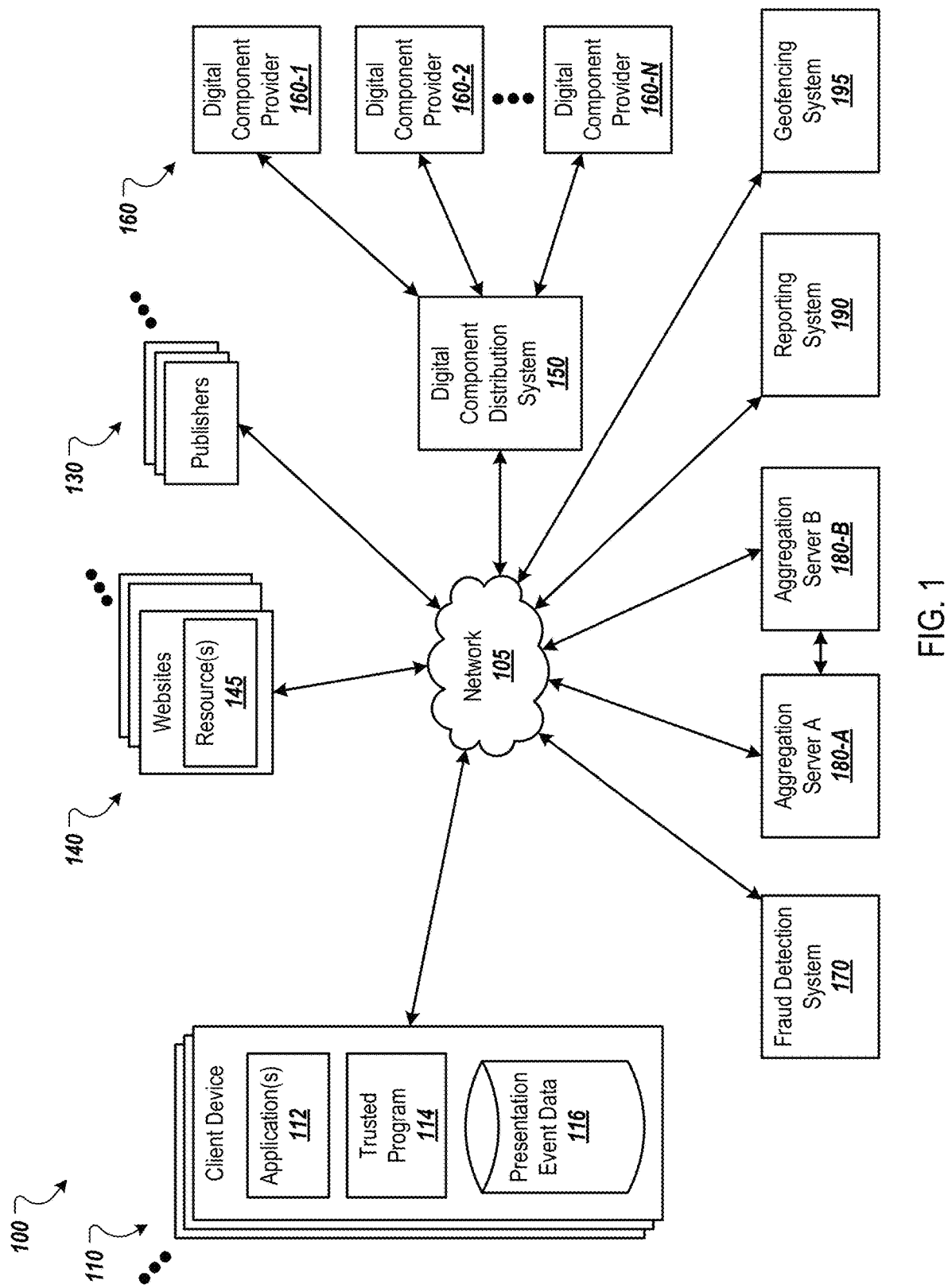
FIG. 1 is a block diagram of an environment in which location event measurements are determined.

FIG. 1 is a block diagram of an example environment 100 in which location event measurements are determined. The example environment 100 includes a data communication network 105, such as a local area network (LAN), a wide area network (WAN), the Internet, a mobile network, or a combination thereof. The network 105 connects client devices 110, publishers 130, websites 140, a digital component distribution system 150, a fraud detection system 170, aggregation servers 180-A and 180-B, a reporting system 190, and a geofencing system 195. The example environment 100 may include many different client devices 110, publishers 130, websites 140, digital component distribution systems 150, and reporting systems 190.

A website 140 is one or more resources 145 associated with a domain name and hosted by one or more servers. An example website is a collection of web pages formatted in HTML that can contain text, images, multimedia content, and programming elements, such as scripts. Each website 140 is maintained by a publisher 130, which is an entity that controls, manages and/or owns one or more websites, including the website 140. A domain can be a domain host, which can be a computer, e.g., a remote server, hosting a corresponding domain name.

A resource 145 is any data that can be provided over the network 105. A resource 145 is identified by a resource address, e.g., a Universal Resource Locator (URL), that is associated with the resource 145. Resources include HTML pages, word processing documents, and portable document format (PDF) documents, images, video, and feed sources, to name only a few. The resources can include content, such as words, phrases, images and sounds, that may include embedded information (such as meta-information in hyperlinks) and/or embedded instructions (such as scripts).

A client device 110 is an electronic device that is capable of communicating over the network 105. Example client devices 110 include personal computers, mobile communication devices, e.g., smart phones, and other devices that can send and receive data over the network 105. A client device can also include a digital assistant device that accepts audio input through a microphone and outputs audio output through speakers. The digital assistant device can also include a camera and/or display to capture images and visually present information. The digital assistant can be implemented in different forms of hardware devices including, a wearable device (e.g., watch or glasses), a smart phone, a speaker device, a tablet device, or another hardware device.

A client device 110 typically includes applications 112, such as web browsers and/or native applications, to facilitate the sending and receiving of data over the network 105. A native application is an application developed for a particular platform or a particular device (e.g., mobile devices having a particular operating system). Publishers 130 can develop and provide, e.g., make available for download, native applications to the client devices 110. In some implementations, the client device 110 is a digital media device, e.g., a streaming device that plugs into a television or other display to stream videos to the television. The digital media device can also include a web browser and/or other applications that stream video and/or present resources.

A web browser can request a resource 145 from a web server that hosts a website 140 of a publisher 130, e.g., in response to the user of the client device 110 entering the resource address for the resource 145 in an address bar of the web browser or selecting a link that references the resource address. Similarly, a native application can request application content from a remote server of a publisher 130.

Some resources 145, application pages, or other application content can include digital component slots for presenting digital components with the resources 145 or application pages. As used throughout this document, the phrase "digital component" refers to a discrete unit of digital content or digital information (e.g., a video clip, audio clip, multimedia clip, image, text, or another unit of content). A digital component can electronically be stored in a physical memory device as a single file or in a collection of files, and digital components can take the form of video files, audio files, multimedia files, image files, or text files and include advertising information, such that an advertisement is a type of digital component. For example, the digital component may be content that is intended to supplement content of a web page or other resource presented by the application 112. More specifically, the digital component may include digital content that is relevant to the resource content (e.g., the digital component may relate to the same topic as the web page content, or to a related topic). The provision of digital components by the digital component distribution system 150 can thus supplement, and generally enhance, the web page or application content.

When the application 112 loads a resource 145 (or application content) that includes one or more digital component slots, the application 112 can request a digital component for each slot from the digital component distribution system 150. The digital component distribution system 150 can, in turn request digital components from digital component providers 160. The digital component providers 160 are entities that provide digital components for presentation with resources 145 and/or application content.

Some digital components correspond to one or more locations of an entity, e.g., the subject of the digital component. The digital components can also be referred to as location digital components. For example, an organization that has one or more physical locations, e.g., stores, can create digital components that include content related to the organization. In some cases, the content is related to the physical locations, e.g., in the form of an address or directions to the location. For example, a restaurant owner can create a digital component that includes an address to the restaurant.

In other examples, the digital component can correspond to one or more physical locations of an entity without including location-based content. For example, a digital component created by a national organization may include visual content about the organization without any specific location-based content.

An entity can link a digital component to one or more locations by specifying geofence data for each of the one or more locations and linking the geofence data to the digital component. The geofence data can indicate a perimeter around the location. For example, the geofence data can include a set of coordinates (e.g., Global Positioning System (GPS) coordinates, or latitude and longitude coordinates) that define the perimeter.

The perimeter defined for each location can be any shape, e.g., a circular area represented by the coordinates of a center point and a radius or a polygon represented by the coordinates of a sequence of corners of the polygon, or a collection of S2 cells.

The geofencing does not need to be continuous. For example, an organization may have five physical locations in a local community, in which case the geofencing may include five circular areas represented by the latitude/longitude of five center points and five corresponding radius.

As described below, the geofencing data is used to determine when location events corresponding to a digital component occur. An example of a location event is a user entering a physical location (e.g., within the perimeter defined by the corresponding geofence data) corresponding to a digital component after the digital component was presented to the user.

The digital components can include data, e.g., in the form of metadata, that specifies parameters including the corresponding geofence data for each physical location corresponding to the digital component (e.g., as specified by an entity that created the digital component), event-level impression data associated with the presentation of the digital component, a presentation expiry (described below), and a resource locator, e.g., Universal Resource Locator (URL) of the reporting system 190 to which reports for the digital component are to be sent. The resource locator can include the eTLD+1 (effective top-level domain plus one label more than the public suffix, e.g. example.com where .com is the top-level domain) endpoint to which the reports for the digital component are to be sent. In some implementations, the data can also include operating hours of the physical locations corresponding to the digital component, e.g., the hours that a store is open.

The client device 110 also includes a trusted program 114 that transmits event reports specifying information related to the presentation of digital components and events that occur following presentation of the digital components. The trusted program 114 can include trusted code from a reliable source that is difficult to falsify. For example, the trusted program 114 can be an operating system, a portion of an operating system, a web browser, etc. Generally, the trusted program 114 is difficult to infiltrate, and the amount of time and effort that a perpetrator would need to expend to tamper with the trusted program 114 is prohibitively high. Additionally, because the trusted program 114 is provided and maintained by a reliable source, any vulnerabilities that arise can be addressed by the source.

The trusted program 114 can be local to client device 110. For example, the trusted program 114 can be a device driver of the operating system of client device 110. In some implementations, the trusted program 114 operates entirely locally to client device 110, reducing the need to transmit user information. In some implementations, the trusted program 114 can operate locally to client device 110 and over a network, such as network 105. For example, the trusted program 114 can be a web browser that is installed on client device 110 and transmits and receives information over the network 105.

When a location digital component is presented by the client device 110, the trusted program 114 can store data related to the presentation in a presentation event data structure 116, which can be a database, table, or other appropriate data structure. The presentation event data structure 116 can be part of a secure data storage maintained by the trusted program 114. The trusted program 114 can store a presentation event data element for each location digital component in the presentation event data structure 116. The presentation event data element for a location digital component can include, for example, the parameters and/or other data of the location digital component and a time at which the presentation occurred. For example, the presentation event data element for a location digital component can include the geofence data of the digital component.

The trusted program 114 can remove the presentation event data for a presentation of a location digital component based on the presentation expiry specified by the digital component. For example, the presentation expiry can be an amount of time that the presentation event data for the digital component can be stored at the client device 110. When that amount of time lapses, the trusted program 114 can remove the presentation event data for the location digital component from the presentation event data structure 116. As described in more detail below, the trusted program 114 can transmit presentation event data to the reporting system 190 for the digital component using the resource locator specified by the digital component.

The trusted program 114 and/or an application 112 can monitor for the client device 110 to enter a location defined by geofence data stored in the presentation event data structure 116. For example, an application 112 of an entity (e.g., a native application of the entity) can interact with a map application or other location application of the client device 110 to determine a current location of the client device 110, e.g., if the user has opted in to the application having access to the location data for the client device 110. The application 112 (or trusted program 114) can also periodically compare the current location to the geofence data stored in the presentation event data structure 116. If the current location is within a geofence defined by a presentation event data element, the application 112 (or trusted program 114) can determine that a location event has occurred. That is, the user has entered a geofence of a digital component that was presented by the client device 110 (or another device of the user, as described below).

In some implementations, when the GPS unit in the device is activated to receive satellite navigation signals and to compute the current device location, the device operating system, or application 112, or trusted program 114 can compare the computed location to the geofence data stored in the presentation event data structure 116. In some implementations, when the wireless radio component, or the device driver for the wireless radio component, detects wireless signal strength changes, or connects to a different carrier base station, the device driver for the wireless radio component, or the operating system re-computes the device location based on the wireless carrier's signals from base stations. The device operating system, or application 112, or trusted program 114 can compare the computed location to the geofence data stored in the presentation event data structure 116. In some implementations, when the Wi-Fi or Bluetooth component of the device detects the presence of Wi-Fi or Bluetooth signal from another Wi-Fi or Bluetooth device with known location, the device operating system, or application 112, or trusted program 114 can compare the known location to the geofence data stored in the presentation event data structure 116. Thus, various ways of obtaining precise location information can be used to determine the location of the client device 110 and trigger the comparison between the location and the geofence data.

In some implementations, the trusted program 114 can verify that a digital component is eligible for location event reporting. For example, the trusted program 114 can send a request to the geofencing system 195 to verify whether a digital component is eligible for location event reporting. The geofencing system 195 can be in the form of one or more computers operated by a trusted entity that evaluates data of digital components to determine whether the digital component is eligible for location event reporting. This request can include, for example, the geofence data for the digital component and/or a name or identifier for the location corresponding to the geofence.

The geofencing system 195 can determine whether the digital component is eligible for location event reporting based on the size of the geofence, the number of people that visit the location in a given time period (e.g., the number of people per day, week, month, etc.), and/or whether the location is classified as sensitive (e.g., particular types of medical clinics). For example, a digital component may not be eligible for location event reporting if the size of a location corresponding to the digital component (e.g., as defined by the geofence data) is below a threshold (e.g., to prevent tracking of specific user location). In another example, a digital component may not be eligible for location event reporting if the number of people that visit the location during the given time period is less than a threshold (e.g., also to prevent tracking of specific user location). These thresholds can be set based on the level of user privacy for the location event reporting. In another example, digital components for which the location matches a sensitive location may not be eligible for location event reporting, e.g., to protect user privacy at these locations. In some implementations, the geofencing system 195 will only deem a digital component eligible for location event reporting if all three tests are passed.

The geofencing system 195 can also conduct additional validations. For example, the geofencing system 195 may only deem a digital component eligible for location event reporting if the entity corresponding to the digital component has a physical location in the geofencing area specified by the digital component. The geofencing system 195 can provide a response to the trusted program 114 that indicates whether the digital component is eligible for location event reporting. If a digital component is not eligible, the trusted program 114 can remove the presentation event data for the digital component from the presentation event data structure 116 and not report location events for that digital component.

The trusted program 114 can report the location event in different ways. In some implementations, the trusted program 114 provides an event report to the reporting system 190. The reporting system 190 can be a system of the digital component provider 160 that provides the digital component or a system of a separate reporting entity that reports location event measurements to the digital component provider 160.

In some implementations, the event report is in the form of an attestation token. The trusted program 114 can generate the attestation token in response to detecting the location event. The attestation token can include a set of data and a digital signature generated based on the set of data. The set of data can include a device public key of the client device 110, an attestation token creation time that indicates a time at which the attestation token is created by the trusted program 114, a device integrity token issued by the fraud detection system 170, and payload data.

The trusted program 114 can generate the digital signature for the set of data using a device private key that corresponds, e.g., that is mathematically linked to, the device public key included in the set of data. For example, the device public key and the device private key can be an asymmetric encryption key pair. The client device 110 can keep its private key confidential so that entities, e.g., the reporting system 190, that receive attestation tokens from the client device 110 can trust the validity of the attestation tokens.

The device integrity token indicates a level of trustworthiness of the client device 110, e.g., at or near the time at which the location event occurred. In some implementations, the trusted program 114 can collect device-level fraud signals and provide the signals to the fraud detection system 170. The fraud detection system 170 can be a trusted system of a trusted entity that evaluates fraud signals and renders a verdict based on the evaluation. The fraud detection system 170 can issue, to the trusted program 114, a device integrity token that includes the verdict. The device integrity token can include a digital signature of the verdict and any other data of the device integrity token using a private key of the fraud detection system 170. In this way, an entity that receives the attestation token including a device integrity token can verify that the data of the device integrity token has not been modified by verifying the digital signature using a public key of the fraud detection system 170. The data of the device integrity token can also include a token creation time indicating a time at which the device integrity token is created. This enables the entity that receives the token to verify that the device integrity token corresponds to the current state of the client device 110 and not a stale state.

In some implementations, the fraud detection system 170, in collaboration with, or per the request of device operating system/trusted program 114, periodically assesses the trustworthiness of the client device 110, issues device integrity tokens cached in a secure location of the client device 110. The cached device integrity token indicates the level of device trustworthiness in the most recent assessment.

The payload data can include the event-level impression data associated with the presentation of the digital component, the location the user visited (e.g., a unique identifier for the location, which can be mapped to the geofence data for the location in the presentation event data structure), a start time of the location event (e.g., a time at which the client device 110 was detected as being within the geofence for the location), an end time for the location event (e.g., a time at which the client device 110 was no longer detected as being within the geofence after entering the geofence), and/or a total duration of the location event (e.g., the difference between the end time and the start time).

In some implementations, to protect user privacy, the trusted program 114 can assign the start time, end time, and/or duration to quantiles rather than the actual values. The quantiles for the start time and/or end time can be a range of minutes and/or seconds. For example, the start time and/or end time can each be assigned to a corresponding two minute (or other appropriate period) quantile. In this example, if the user entered a location defined by a geofence at 10:01 AM, the start time may be assigned to the quantile for 10:00 AM to 10:02 AM. The time period quantiles can be adjusted to properly protect user privacy and still provide useful visit duration data to digital component providers 160.

After obtaining the data for the attestation token, the trusted program 114 can create the attestation token and generate the digital signature of the data using the device private key. The trusted program 114 can then use the resource locator specified by the digital component to send the attestation token to the reporting system 190. As described below, the reporting system 190 can verify the validity of the attestation token and update the location event measurement for the digital component if the validity is verified. The location event measurement can be the number of times users have visited a location after the digital component corresponding to the location is presented by the client devices of the users or is interacted with by the users.

In some implementations, the trusted program 114 reports the location event to the reporting system 190 using a threshold encryption scheme, e.g., rather than, or in addition to sending an attestation token. The trusted program 114 of each client device 110 can use the same threshold encryption scheme to report location events. When the trusted program 114 determines that a location event has occurred for a digital component, the trusted program 114 can use the threshold encryption scheme to generate a share of a secret. The secret can be location event data, e.g., the location identifier of the physical location and/or an identifier for the digital component corresponding to the physical location. The secret can also include other data, such as the duration of the location event, the start time of the location event, and/or the end time of the location event. In these examples, the secret can only be decrypted when a threshold number of users have the same start time (or similar in the case of quantiles), the same (or similar) end times, and/or the same (or similar) durations. The threshold encryption scheme can be an (t, n)-threshold encryption scheme in which at least a threshold t shares of a secret from n parties have to be received to be able to decrypt the secret.

The trusted program 114 can send the share of the secret to the reporting system 190. For example, the trusted program 114 can send a key value pair to the reporting system 190. The key can be a tag that corresponds to the digital component and a value that is the share of the secret. In this way, the reporting system 190 can group the shares having the same tag together. Once at least a threshold number of shares of the secret are received from client devices 110, the reporting system 190 can decrypt the secret, e.g., the location identifier for the physical location visited by the users. The reporting system 190 can then determine or update the location event measurement for the digital component, e.g., based on the number of distinct shares received from the client devices. That is, each share can represent a visit to the location after the digital component is presented at a client device 110. The reporting system 190 can determine the number of visits by determining a sum of the number of shares.

If the secrets are associated with (e.g., linked to) metadata that includes, for example, visit durations, start times, and/or end times, the reporting system 190 can aggregate the durations across multiple decrypted secrets for the same location and/or same digital component. For example, the secret for a particular location with a start time of 10:00 AM would be different from the secret for the same particular location with a start time of 12:00 PM assuming the quantiles are not two hours long. However, the location identifier would be the same. In this example, the reporting system 190 can determine the duration of each location event (e.g., based on the difference between the end time and start time or the reported duration) and aggregate the durations for the location, e.g., by determining an average of the durations.

Different types of (t, n)-threshold encryption schemes can be used to encrypt the event data. For example, (t, n)-threshold encryption schemes that use polynomials or planes to distribute shares of a secret (e.g., the impression and conversion data) and recover the secret when at least t shares are received can be used. In a particular example, the threshold encryption scheme can be a plane-based encryption scheme in which the group key comprises a plane and the measurement data is at a point at which each plane intersects, e.g. Blakley's scheme. In other examples, the threshold encryption scheme can use Chinese remainder theorem, proactive secret sharing, verifiable secret sharing (VSS), or other appropriate threshold encryption schemes.

In some implementations, the trusted program 114 reports presentation events and location events to the aggregation servers 180-A and 180-B. For example, the trusted program 114 can transmit encrypted presentation data to the aggregation server 180-A along with a join key, which can be a blindly signed join key as described below. Similarly, the trusted program 114 can transmit encrypted event data to the aggregation server 180-B along with a join key, which can also be a blindly signed join key. The aggregation servers 180-A and 180-B can use secure multi-party computation to join presentation data that corresponds to event data and decrypt the encrypted presentation data and event data. The aggregation servers 180-A and 180-B can also use thresholding techniques to only decrypt joined presentation and event data received from at least a threshold number of client devices to better protect user privacy. The aggregation servers 180-A and 180-B can provide the decrypted data to the reporting system 190 and the reporting system 190 can generate or update location event measurements based on the decrypted data. The aggregation servers 180-A and 180-B can be maintained and operated by the same or different trusted entities. In some implementations, the trusted program 114 reports presentation and location events to an aggregation service that relies on an alternative secure multi-party computation (MPC) design. This aggregation service can rely on secure MPC and optionally differential privacy techniques to aggregate measurement data while protecting user privacy. The aggregation service can be operated by one or more trusted entities.

In either implementation, the reporting system 190 for each digital component can determine location event measurements for the digital component and provide the measurements to the digital component provider 160 that provides the digital component. These measurements can include, for example, the number of times the digital component was presented at client devices 110, the number of times the digital component was interacted with at client devices 110, the number of times the user of a client device 110 visited a location corresponding the to the digital component after the digital component was presented at the client device 110, the number of times a location event started within a particular time range, the number of times a location event ended within a particular time range, and/or the average duration of the location events. Each digital component provider 160 can select a reporting system 190, which may be a system maintained by the digital component provider 160 or a different entity.

Some implementations can also include differential privacy (or similar) techniques. For example, with some small percentage of probability, the client device 110 does not report a location event that actually happened. In another example, with some small percentage of probability, the client device 110 does report a location event that never happened. In another example, random noise is added to the location event start time, end time or duration. These additional privacy techniques can provide additional privacy for the users. In some implementations, the aggregation server 180-A and 180-B can add differential privacy noise to the report before sending the report to the reporting system 190.

Figure 2:
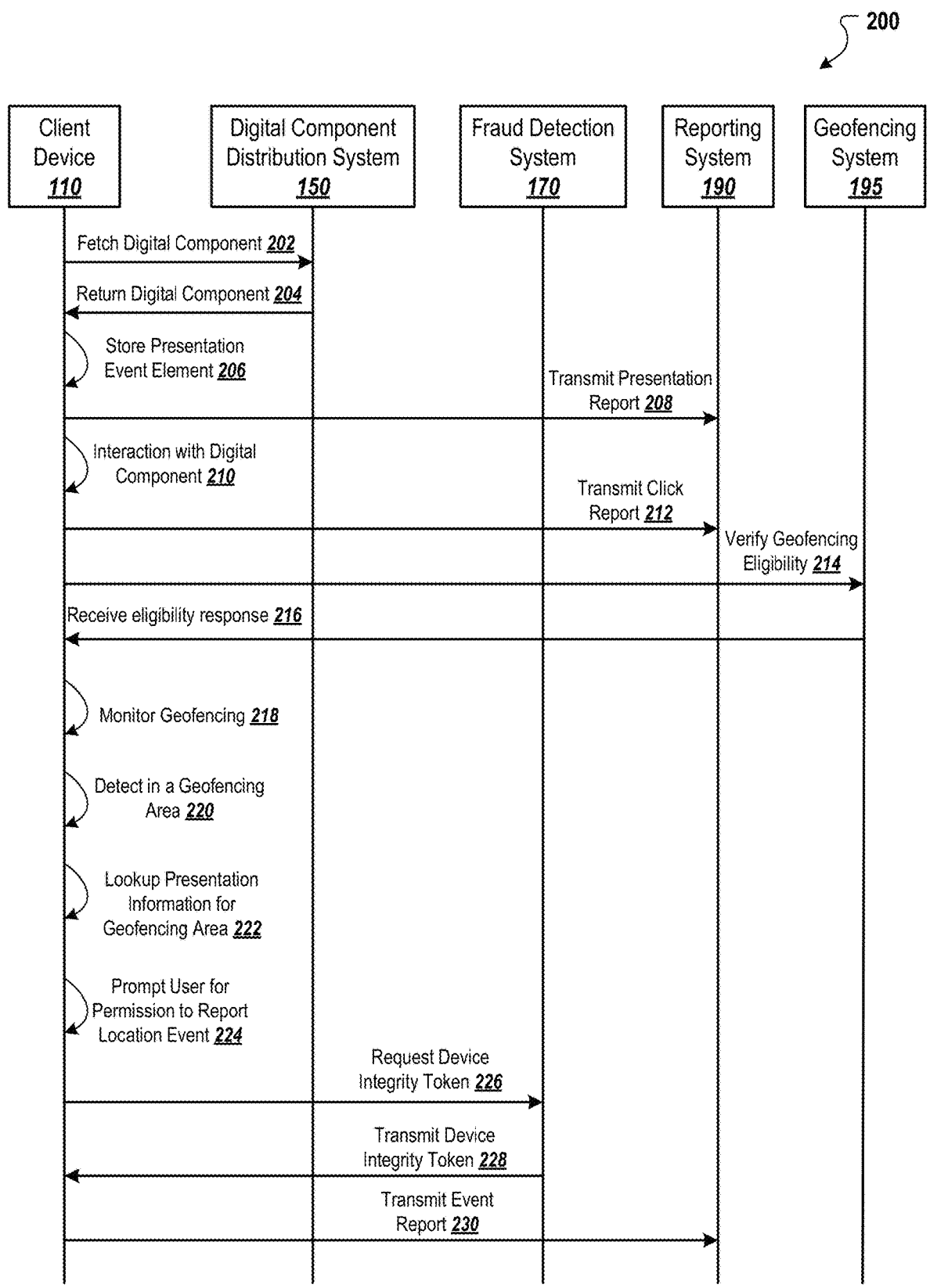
FIG. 2 is a swim lane diagram that illustrates an example process for collecting location event data.

FIG. 2 is a swim lane diagram that illustrates an example process for collecting location event data. The process 200 can be performed by a client device 110, a digital component distribution system 150, a fraud detection system 170, a reporting system 190, and a geofencing system 195.

The client device 110 fetches a digital component (202). For example, the client device 110 can present a resource or application content that includes a digital component slot. In response, the client device 110 can request a digital component from the digital component distribution system 150.

The digital component distribution system 150 returns a location digital component (204). As described above, a location digital component can include data that specifies parameters including geofence data for one or more locations corresponding to the digital component, event-level impression data associated with the presentation of the digital component, a presentation expiry and a resource locator (e.g., an eTLD+1) of the reporting system 190 to which reports for the digital component are to be sent. Once received, the client device 110 can present the digital component.

A trusted program 114 of the client device 110 stores a presentation event data element for the digital component (206). The presentation event data element can include the parameters of the digital component and the time at which the digital component was presented by the client device 110. As described above, the trusted program 114 can temporarily store the presentation event data element in a presentation event data structure based on the presentation expiry specified by the digital component.

The trusted program 114 transmits a presentation report to the reporting system 190 (208). The trusted program 114 can use the resource location specified by the digital component to send the presentation report to the reporting system 190. The presentation report can include, for example, the event-level impression data, an identifier for the digital component, and/or the geofence data specified by the digital component, and/or timestamp when the presentation occurred, the identifier of the device where the presentation occurred, the identifier of the application or the URL of the web page in which the presentation occurred, a screenshot (or the image hash of a screenshot) taken by the device operating system or trusted application to prove that the presentation is indeed visible to the user, and/or a digital signature proof (e.g., a digitally signed attestation token) that the above metadata is authentic.

In some implementations, e.g., in implementations in which event data is reported using attestation tokens, the presentation report can include or be in the form of a presentation attestation token. This presentation attestation token can include a set of data and a digital signature generated using the set of data and the client private key of the client device 110. The set of data can include the device public key of the client device 110, a presentation attestation token creation time that indicates a time at which the presentation attestation token is created by the trusted program 114, a device integrity token issued by the fraud detection system 170, and payload data. The payload data can include the event-level impression data and/or the identifier for the digital component, and/or the geofence data specified by the digital component.

In implementations that use threshold encryption schemes, the presentation data can be included as part of the event data. In implementations that use secure multi-party computation, the presentation report can include encrypted presentation data and a join key, as described in more detail below. In some implementations that use secure multi-party computation, the presentation report can be split into multiple secret shares, and one share for each party in the secure multi-party computation set up.

A user interaction with the digital component is detected (210). The user interaction can be a selection, e.g., click, of the digital component. The client device 110 can monitor for interactions with the digital component while the digital component is presented.

In some implementations, the trusted program 114 transmits a click report to the reporting system 190 (212). The click report can indicate that user interaction with the digital component was detected. In some implementations, the click report can include or be in the form of an attestation token. This attestation token can include a set of data and a digital signature generated using the set of data and the private key of the client device 110. The set of data can include the device public key of the client device 110, an attestation token creation time that indicates a time at which the attestation token is created by the trusted program 114, a device integrity token issued by the fraud detection system 170, and payload data. The payload data can include the event-level impression data, data specifying that user interaction with the digital component was detected, and/or the geofence data of the digital component. In some implementations, the trusted program 114 sends one report for the presentation that specifies whether or not user interaction with the digital component was detected, e.g. rather than one for the presentation and one for the user interaction.

The client device 110 verifies that the digital component is eligible for geofencing and location event reporting (214). For example, the trusted program 114 can send a request to the geofencing system 195 to verify whether a digital component is eligible for location event reporting. As described above, the geofencing system 195 can determine whether the digital component is eligible for location event reporting based on the size of the geofence, the number of people that visit the location in a given time period (e.g., the number of people per day, week, month, etc.), and/or whether the location is classified as sensitive, and/or whether the digital component provider 160 and/or the reporting system 190 is affiliated with, or is authorized by entities who have stores in the geofencing area.

The geofencing system 195 provides an eligibility response to the trusted program (216). The response can indicate whether the digital component is eligible for geofencing and location event reporting.

If the digital component is eligible, the client device 110 can monitor for geofencing with respect to the digital component (218). For example, an application 112 or the trusted program 114 can periodically (or continuously) compare location information indicating the current location of the client device 110 to the geofence(s) defined by the geofence data of the digital component to determine whether the client device 110 is within a location defined by a geofence.

The client device 110 detects that the client device 110 is within an area defined by a geofence of the digital component (220). That is, the trusted program or application can determine that the current location of the client device 110 is within a location defined by a geofence based on the comparison.

The client device 110 can lookup the impression data corresponding to the geofence (222). For example, the trusted program can access the presentation event data element for the digital component in the presentation event data structure 116 and obtain the event-level impression data.

In some implementations, the client device 110 can prompt the user of the client device 110 to provide permission for the client device 110 to transmit an event report for the digital component (224). For example, the trusted program 114 can prompt the user for each potential report or for all subsequent potential reports. For example, the trusted program 114 can present a prompt that enables the user to provide permission for this particular report or for all reports. The user can provide permission for either option or decline sending the reports. A similar prompt can be used for the presentation and click reports described above.

If the user provides permission, the trusted program 114 can request a device integrity token from the fraud detection system (226). The trusted program can collect device-level fraud signals from the client device 110 and provide the signals to the fraud detection system 170. As described above, the fraud detection system 170 can evaluate the fraud signals and render a verdict based on the evaluation. Although the operation of requesting the device integrity token is shown as occurring at this point in the process 200, this operation can occur at any time. For example, the trusted program 114 can periodically fetch and cache device integrity tokens, e.g., asynchronously with this process 200 or asynchronously with user interactions. The fraud detection system 170 can transmit, to the trusted program 114, a device integrity token that includes the verdict (228).

The client device 110 can generate and transmit an event report to the reporting system 190 (230). In some implementations, the event report can include, or be in the form of, an attestation token. This attestation token can include a set of data and a digital signature generated using the set of data and the client private key of the client device 110. The set of data can include a device public key of the client device 110, an attestation token creation time that indicates a time at which the attestation token is created by the trusted program 114, a device integrity token issued by the fraud detection system 170, and payload data.

The payload data can include the event-level impression data associated with the presentation of the digital component, the location the user visited (e.g., a unique identifier for the location, which can be mapped to the geofence data for the location in the presentation event data structure), a start time of the location event (e.g., a time at which the client device 110 was detected as being within the geofence for the location), an end time for the location event (e.g., a time at which the client device 110 was no longer detected as being within the geofence after entering the geofence), and/or a total duration of the location event (e.g., the difference between the end time and the start time). The start time, end time, and/or duration can be quantiled, as described above.

In implementations in which threshold encryption is used, the trusted program 114 can generate an event report that includes a share of a secret that specifies event data comprising at least the geofence data specified by the digital component, as described in more detail below. In implementations in which secure multi-party computation is used, the event report can include encrypted event data and a join key, as described in more detail below. In some implementations in which secure multi-party computation is used, the event report can be split into multiple secret shares, one share for each of the parties in the secure multi-party computation setup.

Figure 3:
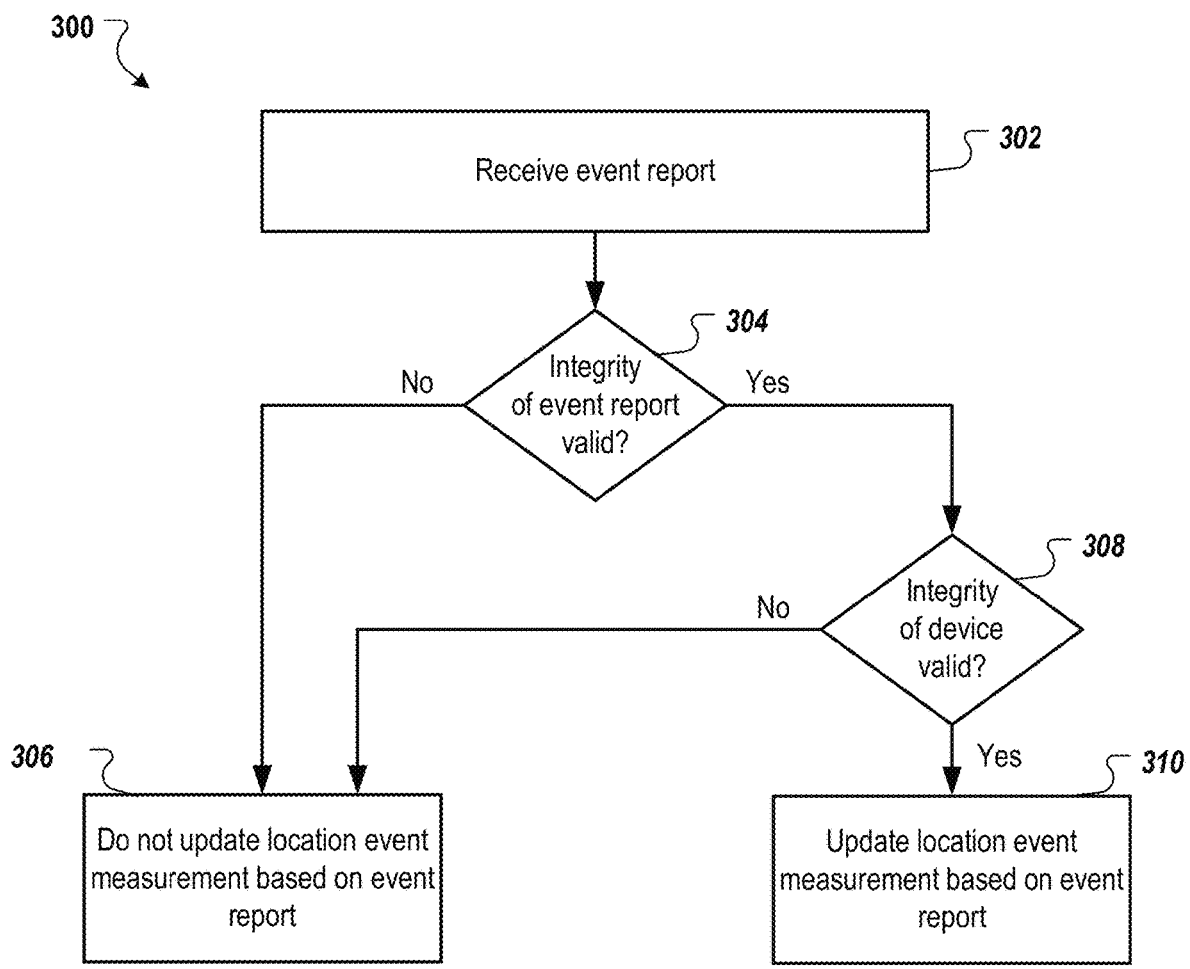
FIG. 3 is a flow diagram that illustrates an example process for determining location event measurements.
Figure 4:
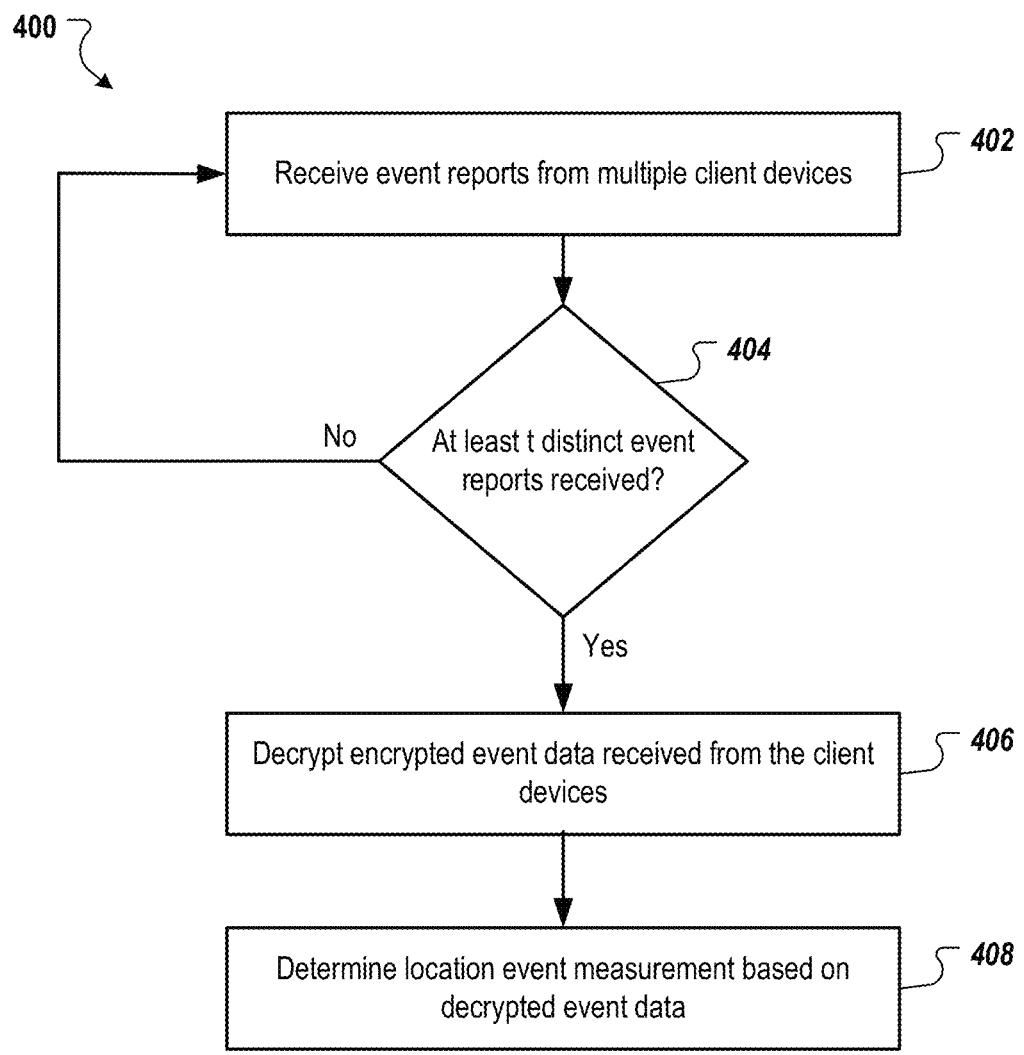
FIG. 4 is a flow diagram that illustrates an example process for determining location event measurements.
Figure 5:
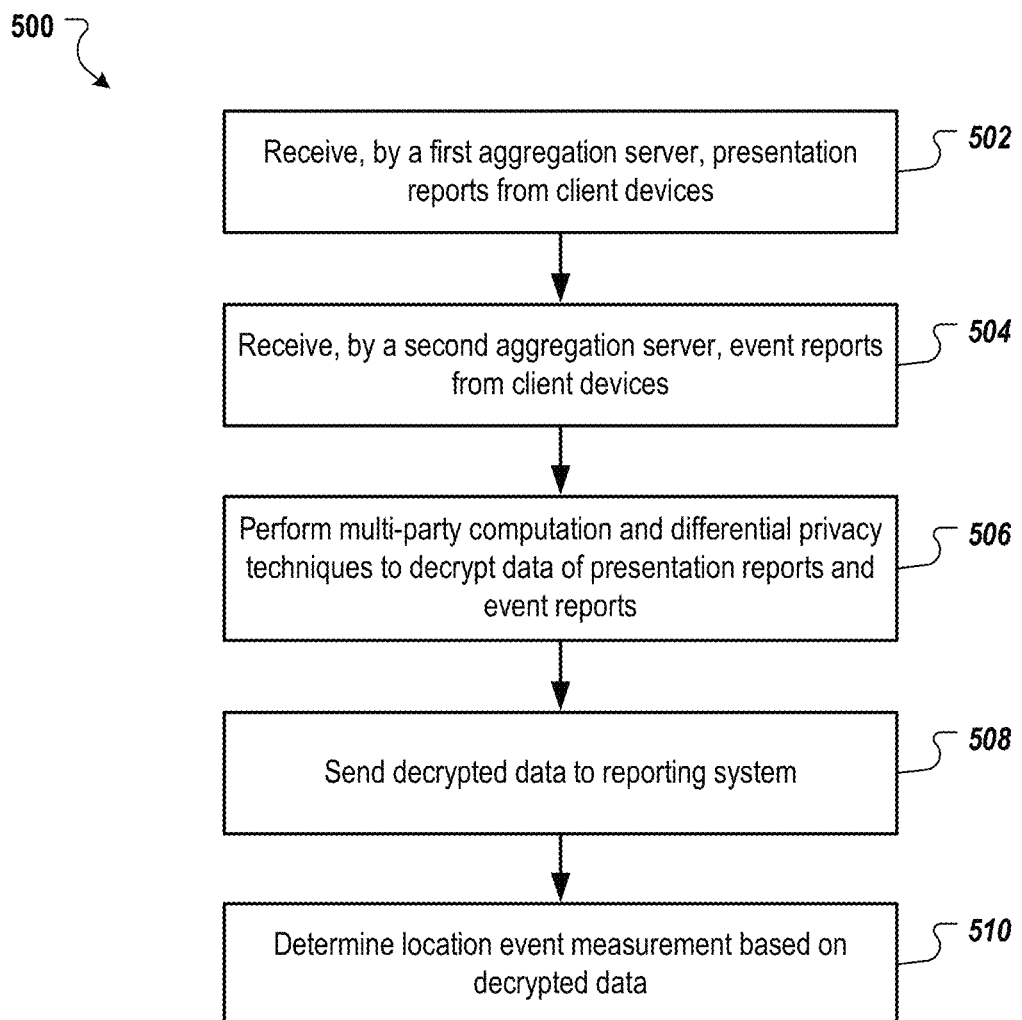
FIG. 5 is a flow diagram that illustrates an example process for determining location event measurements.

The reporting system 190 can receive event reports from multiple client devices and generate location event measurements based on the reported data. FIGS. 3-5 illustrate example processes for determining the validity of event reports and/or decrypting the data of the event reports and determining the location event measurements.

FIG. 3 is a flow diagram that illustrates an example process for determining location event measurements. The process 300 can be implemented, for example, by a reporting system, e.g., the reporting system 190 of FIG. 1. Operations of the process 300 can also be implemented as instructions stored on non-transitory computer readable media, and execution of the instructions by one or more data processing apparatus can cause the one or more data processing apparatus to perform the operations of the process 300. For brevity, the process 300 is described in terms of the reporting system 190 of FIG. 1. The example process 300 uses attestation tokens to report event-level location event measurement data, e.g., whether a user visits a location corresponding to a digital component after the digital component is presented at the client device.

The reporting system 190 receives an event report (302). The event report can include or be in the form of an attestation token. This attestation token can include a set of data and a digital signature generated using the set of data and the client private key of a client device 110 that sent the event report. The set of data can include a device public key of the client device 110, an attestation token creation time that indicates a time at which the attestation token is created by the trusted program 114 of the client device 110, a device integrity token issued by a fraud detection system 170, and payload data. The payload data can include the event-level impression data associated with the presentation of the digital component, the location the user visited (e.g., a unique identifier for the location), a start time of the location event, an end time for the location event, and/or a total duration of the location event. The start time, end time, and/or duration can be quantiled, as described above.

The reporting system 190 determines whether the integrity of the event report is valid (304). The reporting system 190 can determine whether the integrity of the event report is valid based on the set of data of the attestation token and the digital signature of the attestation token. For example, the reporting system 190 can attempt to verify the digital signature of the set of data using the device public key included in the attestation token. If any of the data in the set of data has changed since the digital signature was generated, the verification will fail. If the set of data is the same, the verification will be successful.

If the reporting system 190 determines that the integrity of the event report is not valid, the reporting system 190 does not update the location event measurement(s) for the digital component (306).

If the reporting system 190 determines that the integrity of the event report is valid, the reporting system determines whether the integrity of the client device 110 is valid (308). The reporting system 190 can determine whether the integrity of the client device 110 is trustworthy using the device integrity token of the attestation token. For example, the reporting system 190 can evaluate the verdict of the device integrity token to determine whether the fraud detection system 170 determined that the client device 110 was trustworthy.

The reporting system 190 can also attempt to verify the digital signature of the device integrity token. For example, the reporting system 190 can use a public key of the fraud detection system 170 and the set of data of the device integrity token to attempt to verify the digital signature of the device integrity token.

The reporting system 190 can also evaluate the token creation time for the device integrity token. If the token creation time is within a threshold amount of time of the attestation token creation time or the time at which the event report was sent or received, the reporting system 190 can determine that the device integrity token is not stale.

If the verdict indicates that the client device is trustworthy, the digital signature of the device integrity token is verified successfully, and the device integrity token is not stale, the reporting system 190 can determine that the integrity of the client device 110 was valid. If any of the tests fail, the reporting system 190 can determine that the integrity of the client device 110 is not valid.

If the reporting system 190 determines that the integrity of the client device 110 is not valid, the reporting system 190 does not update the location event measurement(s) for the digital component (306).

If the reporting system 190 determines that the integrity of the client device 110 is valid, the reporting system 190 updates the location event measurement for the digital component (310). For example, the reporting system 190 can update a count of the total number of users that entered a location corresponding to the digital component after the digital component was presented by a device of the user. That is, if the event report corresponds to one location event, the reporting system 190 can increment the count by one. If the digital component corresponds to multiple locations (and therefore includes geofence data for multiple locations), the reporting system 190 can update the count for the location specified by the event report.

The reporting system 190 can also determine other metrics based on the payload data of the event report. For example, the reporting system 190 can use the durations to determine a total or average duration of the visits to the location. The reporting system 190 can also classify the visits to duration ranges such as short visits, medium visits, and long visits based on the duration of each visit. The reporting system 190 can then determine the number of visits in each range.

The reporting system 190 can also determine the average duration of visits to each location corresponding to the digital component, the number of users that visited each location within start time ranges, and/or the number of users that ended their visits within end time ranges. Although the example process 300 is described in terms of location events, a similar process can be used to determine the count of the number of times the digital component was presented or interacted with.

FIG. 4 is a flow diagram that illustrates an example process for determining location event measurements. The process 400 can be implemented, for example, by a reporting system, e.g., the reporting system 190 of FIG. 1. Operations of the process 400 can also be implemented as instructions stored on non-transitory computer readable media, and execution of the instructions by one or more data processing apparatus can cause the one or more data processing apparatus to perform the operations of the process 300. For brevity, the process 400 is described in terms of the reporting system 190 of FIG. 1. The example process 400 uses threshold encryption schemes for aggregate location event measurement data, e.g., the number of users that visit a physical location corresponding to a digital component after the digital component is presented at the client device.

The reporting system 190 receives event reports from multiple client devices (402). When each client device 110 determines that a location event corresponding to a digital component occurs, the client device can generate an event report that includes a share of a secret corresponding to the digital component. Each client device 110 can be configured to implement a common threshold encryption scheme to generate its share of the secret. The threshold encryption scheme can be a plane-based encryption scheme in which the group key includes a plane and the measurement data is at a point at which each plane intersects, e.g. Blakley's scheme. In other examples, the threshold encryption scheme can use Chinese remainder theorem, proactive secret sharing, verifiable secret sharing (VSS), or other appropriate threshold encryption schemes.

The secret can be the event data for the digital component. For example, the event data, and thus the secret, can include the location identifier for the location visited. For measurement of the average duration of visits to the location, the secret can be a combination of the location identifier and the visit duration or visit duration quantile. Similarly, for measurement of the number of visits that started at a particular time or within a particular start time quantile, the event data can be a combination of the location identifier and the particular start time or particular start time quantile. For measurement of the number of visits that ended at a particular time or within a particular end time quantile, the event data can be a combination of the location identifier and the particular end time or particular end time quantile. The event data can also be a combination of the location identifier, the identifier or the impression or digital component, the visit duration (or its quantile), the start time (or its quantile), and/or the end time (or its quantile).

In some implementations, the event data used as the secret is blindly signed data that is blindly signed by the fraud detection system 170. In this example, the trusted program 114 of the client device can use a blinding technique to blind (e.g., obscure) the event data for a location event. In general, a blinding technique can apply a blinding factor to the impression data to generate blinded event data that hides the actual event data such that entities that receive the blinded event data cannot determine the actual event data absent knowledge of the blinding technique and parameters/keys used to generate the blinded impression data. In some implementations, the trusted program 114 blinds the event data for a digital component using the Verifiable, Oblivious Pseudorandom Function (VOPRF) protocol, which is an Internet Engineering Task Force (IETF) draft standard protocol to blind the impression data for a digital component. Other appropriate blind signing techniques can also be used.

The trusted program 114 can send the blinded event data along with device-level fraud signals to the fraud detection system 170. This use of blinded data protects user privacy as the fraud detection system 170 cannot access the actual event data from the blinded event data. The fraud detection system 170 can evaluate the fraud signals to determine whether the client device 110 is trustworthy. If so, the fraud detection system 170 can digitally sign the blinded event data using the blinding technique and return the blind signature to the trusted program 114. The trusted program 114 can use the blinding technique to verify the blind signature. The trusted program 114 can also use the blinding technique to unblind the event data.

The trusted program 114 can use the threshold encryption scheme to generate a share of the secret, e.g., the event data or blindly signed blinded event data. The trusted program 114 can also generate a tag for the event data. The tag can be a number that uniquely identifies the event data and that is based on at least a portion of the event data. For example, each trusted program 114 can be configured to generate a tag based on the event data such that each trusted program generates the same tag for the same event data.

The trusted program 114 can then provide the event report to the reporting system 190. The event report can include the tag that identifies the event data and the share of the secret.

The reporting system 190 determines whether at least a threshold number of distinct event reports having the same tag have been received (404). Using threshold encryption, the secret cannot be decrypted unless at least a threshold number of distinct shares of the secret are received. If the number of received event reports having the same tag is less than the threshold, the process 400 returns to step 402 to wait for additional event reports.

If the number of received event reports having the same tag is greater than or equal to the threshold, the reporting system 190 can decrypt the secret (406). The reporting system 190 can use the threshold encryption scheme and the shares of the secret included in the event reports to decrypt the secret, e.g., the event data or the blindly signed event data.

If the event data is blindly signed event data, the reporting system 190 can check the validity of the blind signature to ensure that the client device is trustworthy. In some implementations, the reporting system 190 can send the blindly signed blinded event data to the fraud detection system 170 with a request to verify the blind signature. The fraud detection system 170 can use the blinding technique to verify the blind signature and respond to the reporting system 190 with a report as to whether the blind signature was verified successfully. In other implementations that depend on publicly verifiable blind signature schemes, the reporting system 190 doesn't need to request the fraud detection system 170 to verify the blind signature. Instead, the reporting system 190 can verify the blind signature independently after downloading the verification key from the fraud detection system 170.

The reporting system 190 determines a location event measurement for the digital component based on the event reports (408). For example, the reporting system 190 can determine a count of the total number of users that entered a location corresponding to the digital component after the digital component was presented by a device of the user. This can correspond to the number of distinct event reports received that include the tag for the event data.

The reporting system 190 can also determine other metrics depending on the data included in the secret. For example, the reporting system 190 can use the durations to determine a total or average duration of the visits to the location. The reporting system 190 can also classify the visits to duration ranges such as short visits, medium visits, and long visits based on the duration of each visit. The reporting system 190 can then determine the number of visits in each range.

The reporting system 190 can also determine the average duration of visits to each location corresponding to the digital component, the number of users that visited each location within start time ranges, and/or the number of users that ended their visits within end time ranges.

FIG. 5 is a flow diagram that illustrates an example process for determining location event measurements. The process 500 can be implemented, for example, by aggregation servers and a reporting system, e.g., the aggregation servers 180-A and 180-B and the reporting system 190 of FIG. 1. Operations of the process 500 can also be implemented as instructions stored on non-transitory computer readable media, and execution of the instructions by one or more data processing apparatus can cause the one or more data processing apparatus to perform the operations of the process 500. The example process 500 uses secure multi-party computation and optional differential privacy techniques to aggregate location event measurement data, e.g., the number of users that visit a physical location corresponding to a digital component after the digital component is presented at the client device.

The aggregation server 180-A receives presentation reports from client devices 110 (502). A client device 110 can generate and provide a presentation report for a digital component in response to presenting the digital component. Each presentation report can include encrypted presentation data for a presentation of a digital component and a presentation join key. The presentation data can include, for example, the geofence data specified by the digital component and event-level impression data associated with the presentation of the digital component. The presentation data can be encrypted using a public key of the aggregation server 180-A and a public key of the aggregation server 180-B. The presentation data can also be encrypted using a public key of the reporting system 190 for the digital component. For example, the trusted program 114 of the client device 110 that sends a presentation report to aggregation server 180-A can encrypt the presentation data using a public key of the reporting system 190, then encrypt this encrypted data using a public key of the aggregation server 180-A and then encrypt this encrypted data using a public key of the aggregation server 180-B.

The presentation join key can be a blindly signed key that includes an encrypted data element that includes an encrypted combination of at least the resource locator for the reporting system, an identifier of the client device 110 or a pseudonymous identifier for the user for cross-device conversion measurement, and location identifier for a location corresponding to the geofence data of the digital component. The presentation join key can also include a deterministic blind signature of the encrypted data element. For example, the fraud detection system 170 can evaluate device-level fraud signals provided by the trusted program 114 and blindly sign the encrypted data element if the client device 110 is trustworthy. The presentation join key is used to join presentation reports with corresponding event reports.

The aggregation server 180-B receives event reports from client devices 110 (504). A client device 110 can generate and provide an event report for a digital component in response to determining that the user visited a location corresponding to the geofence data of the digital component after presentation of the digital component. Each presentation report can include encrypted event data for a digital component and a presentation join key. The event data can include, for example, the digital component identifier, the visit duration (or its quantile), and/or the visit start and/or end time (or their quantiles).

The event data can be encrypted using a public key of the aggregation server 180-A and a public key of the aggregation server 180-B. The event data can also be encrypted using a public key of the reporting system 190 for the digital component. For example, the trusted program 114 of the client device 110 that sends an event report can encrypt the presentation data using a public key of the reporting system 190, then encrypt this encrypted data using a public key of the aggregation server 180-B and then encrypt this encrypted data using a public key of the aggregation server 180-A.

The event join key can be a blindly signed key that includes an encrypted data element that includes an encrypted combination of at least the resource locator for the reporting system, an identifier of the client device 110 or a pseudonymous identifier for the user for cross-device conversion measurement, and the location identifier for the location visited by the user. The event join key can also include a deterministic blind signature of the encrypted data element. For example, the fraud detection system 170 can evaluate device-level fraud signals provided by the trusted program 114 and blindly sign the encrypted data element if the client device 110 is trustworthy. The event join key is used to join presentation reports with corresponding event reports.

The identifier of the join keys can differ in different implementations. For example, the identifier can be an identifier of the client device 110, a device public key of the client device 110, or other appropriate information unique to the client device 110, an identifier of the user of the client device 110 (if permitted by the user), or the application for which the reports are generated.

The aggregation server 180-A and the aggregation server 180-B perform secure multi-party computation to securely join then decrypt the presentation reports and event reports (506). This process can include joining the presentation reports with corresponding event reports using the join keys. As the join keys are based on the location identifier for the location visited by the user and that corresponds to the digital component, and the identifier of the client device 110, the join keys can be used to join a presentation report for a presentation of a digital component at a client device 110 with the event report for a location event (if there is one).

The encrypted event data fora location event will be the same for each same event at different client devices since the event data would be the same and the public keys used to encrypt the data would be the same. For example, the event data for a visit to the same geofence area associated with the same location digital component at two different client devices would be the same. Similarly, the event data for a visit to the same location and for the same duration quintile at two different client devices would be the same. The encrypted presentation data for the same digital component would also be the same across multiple client devices.

Thus, each joined pair of encrypted presentation data and corresponding encrypted event data having the same encrypted presentation data and the same encrypted event data represents a unique location event for the digital component having the same event data. After joining the encrypted presentation data and corresponding event data, the aggregation servers 180-A and 180-B can count the number of occurrences of each pair, e.g., the number of unique keys that are all linked to the same joined pair of encrypted presentation data and corresponding encrypted event data. If the event data is for a visit to a particular location corresponding to a particular digital component, this count represents the number of users that visited the particular location after the digital component was presented at the client device. Similarly, if the event data is for a visit to a particular location having a particular visit duration quintile, the count represents the number of visits to the particular location that lasted a duration within the duration range of the particular visit duration quintile. The aggregation servers 180-A and 180-B can determine these location event measurements for each joined pair of encrypted presentation data and corresponding encrypted event data.

The secure multi-party computation process can also include encrypting and decrypting the reports using the private keys of the aggregation servers 180-A and 180-B and passing the encrypted/decrypted data between the two aggregation servers 180-A and 180-B. If the reports are also encrypted using a public key of the reporting system 190, the aggregation servers 180-A and 180-B cannot access the actual data of the reports.

In some implementations, the secure multi-party computation process can employ thresholding techniques. For example, the aggregation servers 180-A and 180-B may only determine location event measurements for joined pairs of encrypted presentation data and corresponding encrypted event data that have at least a threshold number of unique join keys, e.g., that have been reported by at least a threshold number of client devices 110. Similarly, the aggregations servers 180-A and 180-B may only decrypt data for joined pairs of encrypted presentation data and corresponding encrypted event data that have at least a threshold number of unique join keys. This protects user privacy by not decrypting data from a small number of client devices that may be linked back to particular client devices.

The aggregation servers 180-A and 180-B send the decrypted data to the reporting system 190 (508). The reporting system 190 can also determine location event measurement(s) based on the decrypted data. For example, the reporting system 190 can determine a count of the total number of visits to a location that occurred at client devices after presentation of the digital component at the client device based on the event report and/or the number of presentations of the digital component at the client devices 110.

The reporting system 190 can also determine other metrics based on the decrypted data, such as average visit durations, the number of short, medium, and long visits, the number of visits that started within a particular start time range, and/or the number of visits that ended within a particular end time range. To do so, the reporting system 190 can aggregate the decrypted data that includes the location identifier for the location and compute the metrics based on the aggregated data.

The techniques described above can also be used to determine location event measurements for location events that are detected by a different device than a device at which the digital component was presented. For example, a digital component having associated geofence data can be presented on a tablet computer or a smart television that the user is logged into. The user may then visit the location while carrying a smart phone. The smart phone can detect and report the location event based on geofence data received from the other device.

In some implementations, the multiple devices of a user (e.g., devices that the user is logged into) can synchronize presentation event data for digital components. In one example, a trusted program of each device can synchronize the presentation event data in their respective presentation event data structure 116. In another example, web browsers on each device can synchronize the presentation event data with each other. In this way, when a user visits a location with one of the devices, that device can determine whether a location event for one of the digital components has occurred by comparing the current location of the device to the synchronized geofence data of the synchronized event data. If detected, the device can report the location event as described above.

In implementations in which presentation event data is reported to a different server than location event data, e.g., as described above with reference to FIG. 5, the synchronization may not be required. For example, the trusted program of each device of a user can transmit presentation reports for each location digital component. These presentation reports can include an identifier for the user, e.g., in addition to or in place of the identifier for the client device. Similarly, the trusted program of each device of the user can transmit an event report for each location event detected by the device. These event reports can also include the identifier for the user. The join keys for the presentations and location events can be based on the identifier of the user such that the join key for the presentation event for a presentation of a digital component will be the same as the join key for the location event for the digital component. In this way, the presentation event from one device will be joined with the corresponding location event from another device during the secure multi-party computation process.

Further to the descriptions above, a user may be provided with controls allowing the user to make an election as to both if and when systems, programs, or features described herein may enable collection of user information (e.g., information about a user's social network, social actions, or activities, profession, a user's preferences, or a user's current location), and if the user is sent personalized content or communications from a server. In addition, certain data may be treated in one or more ways before it is stored or used, so that personally identifiable information is removed. For example, a user's identity may be treated so that no personally identifiable information (e.g., phone number, IMEI, device serial number) can be determined for the user, or a user's geographic location may be generalized where location information is obtained (such as to a city, ZIP code, or state level), so that a particular location of a user cannot be determined. Thus, the user may have control over what information is collected about the user, how that information is used, the information retention policy, and what information is provided to the user.

Figure 6:
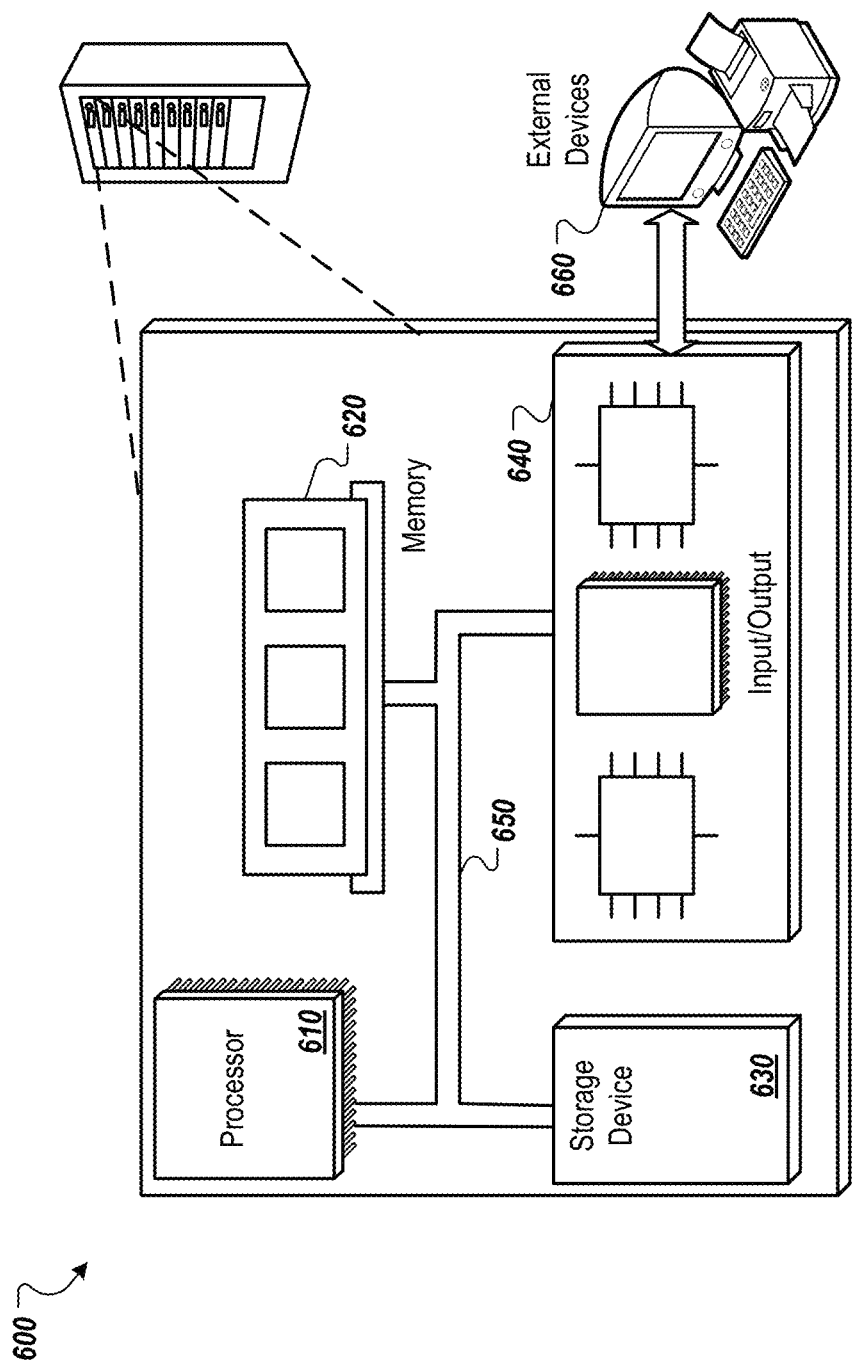
FIG. 6 is a block diagram of an example computer system that can be used to perform operations described above.

FIG. 6 is a block diagram of an example computer system 600 that can be used to perform operations described above. The system 600 includes a processor 610, a memory 620, a storage device 630, and an input/output device 640. Each of the components 610, 620, 630, and 640 can be interconnected, for example, using a system bus 650. The processor 610 is capable of processing instructions for execution within the system 600. In some implementations, the processor 610 is a single-threaded processor. In another implementation, the processor 610 is a multi-threaded processor. The processor 610 is capable of processing instructions stored in the memory 620 or on the storage device 630.

The memory 620 stores information within the system 600. In one implementation, the memory 620 is a computer-readable medium. In some implementations, the memory 620 is a volatile memory unit. In another implementation, the memory 620 is a non-volatile memory unit.

The storage device 630 is capable of providing mass storage for the system 600. In some implementations, the storage device 630 is a computer-readable medium. In various different implementations, the storage device 630 can include, for example, a hard disk device, an optical disk device, a storage device that is shared over a network by multiple computing devices (e.g., a cloud storage device), or some other large capacity storage device.

The input/output device 640 provides input/output operations for the system 600. In some implementations, the input/output device 640 can include one or more of a network interface devices, e.g., an Ethernet card, a serial communication device, e.g., and RS-232 port, and/or a wireless interface device, e.g., and 802.11 card. In another implementation, the input/output device can include driver devices configured to receive input data and send output data to external devices 660, e.g., keyboard, printer and display devices. Other implementations, however, can also be used, such as mobile computing devices, mobile communication devices, set-top box television client devices, etc.

Although an example processing system has been described in FIG. 6, implementations of the subject matter and the functional operations described in this specification can be implemented in other types of digital electronic circuitry, or in computer software, firmware, or hardware, including the structures disclosed in this specification and their structural equivalents, or in combinations of one or more of them.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage media (or medium) for execution by, or to control the operation of, data processing apparatus. Alternatively, or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

The invention claimed is:

1. A method comprising:
presenting, by a client device, a digital component comprising geofence data that defines one or more physical locations corresponding to the digital component;
in response to presenting the digital component, storing, by the client device and in a presentation event data structure, a presentation event data element specifying the geofence data;
detecting, based on location information indicating a current location of the client device and the geofence data, that the client device is within one of the one or more physical locations; and
in response to detecting that the client device is within one of the one or more physical locations, providing, to a reporting system for the digital component, an event report indicating that a location event for the digital component has occurred, the location event being a visit to the one physical location after the digital component was presented by the client device, wherein the event report comprises an attestation token comprising,
  a set of data comprising a device public key of the client device, an attestation token creation time indicating a time at which the attestation token was created, and payload data comprising a location identifier for the one physical location,
  a digital signature of the set of data generated using a device private key corresponding to the device public key, and
  a device integrity token comprising data indicating a level of trustworthiness of the client device and an additional digital signature generated based on the data indicating the level of trustworthiness of the client device and a private key of a fraud detection system that assigned the level of trustworthiness to the client device,
wherein the reporting system is configured to verify an integrity of the event report based on the set of data and the digital signature of the attestation token.

2. The method of claim 1, wherein verifying the integrity of the event report comprises:
verifying the digital signature using the payload data and the public key; and
determining that the attestation token creation time is within a threshold duration of a current time.

3. The method of claim 1, further comprising determining whether an integrity of the client device is valid, comprising:
determining that the client device is trustworthy based on the level of trustworthiness of the client device; and
verifying the additional digital signature using the data indicating the level of trustworthiness of the client device and a public key of the fraud detection system.

4. The method of claim 3, wherein the reporting system is configured to:
whenever the integrity of the client device is valid, updating one or more location event measurements for the digital component; and
whenever the integrity of the client device is not valid, ignoring the event report.

5. The method of claim 1, further comprising at least one of:
   assigning a visit duration of the visit to a given visit duration quantile of a plurality of visit duration quantiles and including the visit duration quantile in the payload data;
   assigning a starting time of the visit to a given start time quantile of a plurality of start time quantiles and including the given start time quantile in the payload data; or
   assigning an end time of the visit to a given end time quantile of a plurality of end time quantiles and including the given end time quantile in the payload data.

6. The method of claim 1, further comprising transmitting, to the reporting system, a presentation report comprising a presentation attestation token in response to presenting the digital component, the presentation attestation token comprising the set of data and the digital signature of the set of data.

7. A system, comprising:
   one or more processors of a client device; and
   one or more computer-readable media storing instructions that, when executed by the one or more processors, cause the one or more processors to perform operations comprising:
      presenting, by the client device, a digital component comprising geofence data that defines one or more physical locations corresponding to the digital component;
      in response to presenting the digital component, storing, by the client device and in a presentation event data structure, a presentation event data element specifying the geofence data;
      detecting, based on location information indicating a current location of the client device and the geofence data, that the client device is within one of the one or more physical locations; and
      in response to detecting that the client device is within one of the one or more physical locations, providing, to a reporting system for the digital component, an event report indicating that a location event for the digital component has occurred, the location event being a visit to the one physical location after the digital component was presented by the client device, wherein the event report comprises an attestation token comprising,
         a set of data comprising a device public key of the client device, an attestation token creation time indicating a time at which the attestation token was created, and payload data comprising a location identifier for the one physical location,
         a digital signature of the set of data generated using a device private key corresponding to the device public key, and
         a device integrity token comprising data indicating a level of trustworthiness of the client device and an additional digital signature generated based on the data indicating the level of trustworthiness of the client device and a private key of a fraud detection system that assigned the level of trustworthiness to the client device,
      wherein the reporting system is configured to verify an integrity of the event report based on the set of data and the digital signature of the attestation token.

8. The system of claim 7, wherein verifying the integrity of the event report comprises:
   verifying the digital signature using the payload data and the public key; and
   determining that the attestation token creation time is within a threshold duration of a current time.

9. The system of claim 7, wherein the operations comprise determining whether an integrity of the client device is valid, comprising:
   determining that the client device is trustworthy based on the level of trustworthiness of the client device; and
   verifying the additional digital signature using the data indicating the level of trustworthiness of the client device and a public key of the fraud detection system.

10. The system of claim 9, wherein the reporting system is configured to:
   whenever the integrity of the client device is valid, updating one or more location event measurements for the digital component; and
   whenever the integrity of the client device is not valid, ignoring the event report.

11. The system of claim 7, wherein the operations comprises at least one of:
   assigning a visit duration of the visit to a given visit duration quantile of a plurality of visit duration quantiles and including the visit duration quantile in the payload data;
   assigning a starting time of the visit to a given start time quantile of a plurality of start time quantiles and including the given start time quantile in the payload data; or
   assigning an end time of the visit to a given end time quantile of a plurality of end time quantiles and including the given end time quantile in the payload data.

12. The system of claim 7, wherein the operations comprise transmitting, to the reporting system, a presentation report comprising a presentation attestation token in response to presenting the digital component, the presentation attestation token comprising the set of data and the digital signature of the set of data.

13. A non-transitory computer-readable media storing instructions that, when executed by one or more computers, cause the one or more computers to perform operations comprising:
   presenting, by a client device, a digital component comprising geofence data that defines one or more physical locations corresponding to the digital component;
   in response to presenting the digital component, storing, by the client device and in a presentation event data structure, a presentation event data element specifying the geofence data;
   detecting, based on location information indicating a current location of the client device and the geofence data, that the client device is within one of the one or more physical locations; and
   in response to detecting that the client device is within one of the one or more physical locations, providing, to a reporting system for the digital component, an event report indicating that a location event for the digital component has occurred, the location event being a visit to the one physical location after the digital component was presented by the client device, wherein the event report comprises an attestation token comprising,
      a set of data comprising a device public key of the client device, an attestation token creation time indicating a time at which the attestation token was created, and payload data comprising a location identifier for the one physical location, a digital signature of the set of data generated using a device private key corresponding to the device public key, and a device integrity token comprising data indicating a level of trustworthiness of the client device and an additional digital signature generated based on the data indicating the level of trustworthiness of the client device and a private key of a fraud detection system that assigned the level of trustworthiness to the client device, wherein the reporting system is configured to verify an integrity of the event report based on the set of data and the digital signature of the attestation token.

14. The non-transitory computer-readable media of claim 13, wherein verifying the integrity of the event report comprises:

verifying the digital signature using the payload data and the public key; and determining that the attestation token creation time is within a threshold duration of a current time.

15. The non-transitory computer-readable media of claim 14, wherein the operations comprise determining whether an integrity of the client device is valid, comprising:

determining that the client device is trustworthy based on the level of trustworthiness of the client device; and verifying the additional digital signature using the data indicating the level of trustworthiness of the client device and a public key of the fraud detection system.

16. The non-transitory computer-readable media of claim 15, wherein the reporting system is configured to:

whenever the integrity of the client device is valid, updating one or more location event measurements for the digital component; and whenever the integrity of the client device is not valid, ignoring the event report.

17. The non-transitory computer-readable media of claim 13, wherein the operations comprises at least one of:

assigning a visit duration of the visit to a given visit duration quantile of a plurality of visit duration quantiles and including the visit duration quantile in the payload data;

assigning a starting time of the visit to a given start time quantile of a plurality of start time quantiles and including the given start time quantile in the payload data; or assigning an end time of the visit to a given end time quantile of a plurality of end time quantiles and including the given end time quantile in the payload data.

* * * * *